US011946858B2

(12) United States Patent  
Satou et al.

(10) Patent No.: US 11,946,858 B2  
(45) Date of Patent: Apr. 2, 2024

(54) EXAMINATION DEVICE

(71) Applicant: HITACHI HIGH-TECH CORPORATION, Tokyo (JP)

(72) Inventors: Yoshihiro Satou, Tokyo (JP); Toshio Masuda, Tokyo (JP); Hitoshi Matsuno, Tokyo (JP); Kei Shibayama, Tokyo (JP); Osamu Yoshimura, Ibaraki (JP); Yuichirou Iijima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 364 days.

(21) Appl. No.: 17/285,557

(22) PCT Filed: Oct. 7, 2019

(86) PCT No.: PCT/JP2019/039433  
§ 371 (c)(1),  
(2) Date: Apr. 15, 2021

(87) PCT Pub. No.: WO2020/095594  
PCT Pub. Date: May 14, 2020

(65) Prior Publication Data  
US 2021/0404946 A1 Dec. 30, 2021

(30) Foreign Application Priority Data  
Nov. 7, 2018 (JP) .................... 2018-209474

(51) Int. Cl.  
*G01N 21/15* (2006.01)  
*G01N 21/95* (2006.01)

(52) U.S. Cl.  
CPC ......... *G01N 21/15* (2013.01); *G01N 21/9501* (2013.01); *G01N 2021/151* (2013.01)

(58) Field of Classification Search  
CPC ............. G01N 2021/151; G01N 21/15; G01N 21/9501  
USPC ...................... 356/237.1–237.6, 239.1–239.8  
See application file for complete search history.

(56) References Cited

U.S. PATENT DOCUMENTS

2012/0144938 A1 6/2012 Inagaki et al.

FOREIGN PATENT DOCUMENTS

| JP | 2010-236948 A | 10/2010 |
| JP | 2010236948 A | * 10/2010 |
| JP | 2011-075351 A | 4/2011 |

OTHER PUBLICATIONS

International Search Report of PCT/JP2019/039433 dated Nov. 26, 2019.

* cited by examiner

*Primary Examiner* — Tri T Ton  
(74) *Attorney, Agent, or Firm* — MATTINGLY & MALUR, PC

(57) ABSTRACT

The purpose of the present invention is to allow a clean airflow around a substrate to reliably move downward of the substrate in an examination device in which clean air is supplied to an inspection chamber. This examination device is provided with a rectifying plate (see FIG. 4A) which covers a part of the upper surface of a stage for mounting a substrate, and is disposed between a gas supply unit and the stage to block an airflow toward the substrate.

17 Claims, 13 Drawing Sheets

EXAMINATION DEVICE

TECHNICAL FIELD

The present invention relates to an examination device for inspecting a substrate.

BACKGROUND ART

In the semiconductor manufacturing process, the presence of a foreign matter on a substrate (semiconductor wafer) causes defects such as a wiring insulation defect and a short circuit. These foreign matters are mixed in various states, such as those generated from moving parts such as a transport device, those generated from the human body, those generated by reaction in a processing device by process gas, and those in which chemicals and materials are mixed. The same applies to the manufacturing process of a magnetic disk or a liquid crystal display element, and the generated foreign matter adhering to a substrate (magnetic disk or liquid crystal display element) causes a defect.

In view of the above, in the manufacturing process, a foreign matter on a substrate surface is detected and managed using a surface examination device to monitor and control a dust generation situation of each manufacturing device and the cleanliness of each process in an attempt to suppress deterioration of product quality, decrease in yield, and the like. However, even in such a surface examination device, a foreign matter may be generated from the moving parts and the like, and there is a concern for adhesion of a foreign matter to a substrate as an inspection target (substrate to be inspected) as in other processes.

PTLs 1 and 2 are mainly mentioned as prior arts relating to the cleaning technique of an examination device.

PTL 1 describes a surface examination device that inspects a surface condition of a substrate. The document describes the technique in which "in the surface examination device for inspecting a wafer 1, placed on a wafer chuck 7 provided inside a detection unit 14 inside a case 15 by speedily rotating the wafer 1, clean air is supplied to the periphery of the wafer 1 in the detection unit 14 by an FFU 3, and air in the detection unit 14 is discharged by an exhaust port provided below the wafer chuck 7, so as to set a turbulent flow generated at the periphery to be a laminar flow, in a case where the wafer chuck 7 and the wafer 1 are rotated speedily by a rotary mechanism 4 provided below the wafer chuck 7" for the object of "providing a surface examination device capable of easily calibrating detection sensitivity, and a method of calibrating the surface examination device" (See summary).

PTL 2 discloses that, in order to clean the inside of a device, a plurality of fans and exhaust units for supplying clean air called fan filter units are disposed, and the turbulence of the airflow in the device is suppressed by controlling the flow rate of each so as to reduce the number of attached foreign matters.

CITATION LIST

Patent Literature

PTL 1: JP 2010-236948 A
PTL 2: JP 2011-75351 A

SUMMARY OF INVENTION

Technical Problem

In PTL 1, members such as an airflow guide 212 (FIG. 2 of the document) and a louver 412 (FIG. 6 of the document) guide the airflow around the wafer to the exhaust port and suppress the generation of turbulence. However, in the document, most of the suction force that guides the airflow to the exhaust port depends on the exhaust fan unit 11. Therefore, in the document, the airflow around the wafer may be pushed back by the airflow supplied from the FFU 9 and return onto the wafer. This increases the possibility that the wafer will be contaminated by the adhesion of a foreign matter.

In PTL 2, the rotating airflow generated by the rotation at about several thousand rpm of the stage on which the wafer is placed in the examination device has a higher flow velocity than the airflow supplied from the fan filter unit as disclosed in PTL 1 and tends to become dominant flow in the inspection unit. Therefore, it is not possible to completely eliminate the hoisting of a foreign matter and the turbulence of the airflow due to the rotating airflow only by the method disclosed in PTL 1.

The present invention has been made in view of the above problem and provides clean air, and an object of the present invention is to allow clean airflow around a substrate to reliably move downward of a substrate in an examination device in which clean air is supplied to an inspection chamber.

Solution to Problem

The examination device according to the present invention includes a rectifying plate which covers a part of the upper surface of a stage for mounting a substrate in a manner overlapping with the outer peripheral portion, guides an airflow from a gas supply unit downward from the outer peripheral portion of the stage, and is disposed between the gas supply unit and the stage to block an airflow toward the substrate.

Advantageous Effects of Invention

According to the examination device according to the present invention, clean air supplied to an inspection chamber can be allowed to reliably move downward of a substrate around the substrate. In this manner, it is possible to suppress the possibility that an airflow is caused to return onto the substrate and the substrate is contaminated due to the adhesion of a foreign matter.

DESCRIPTION OF EMBODIMENTS

First Embodiment

Figure 1:
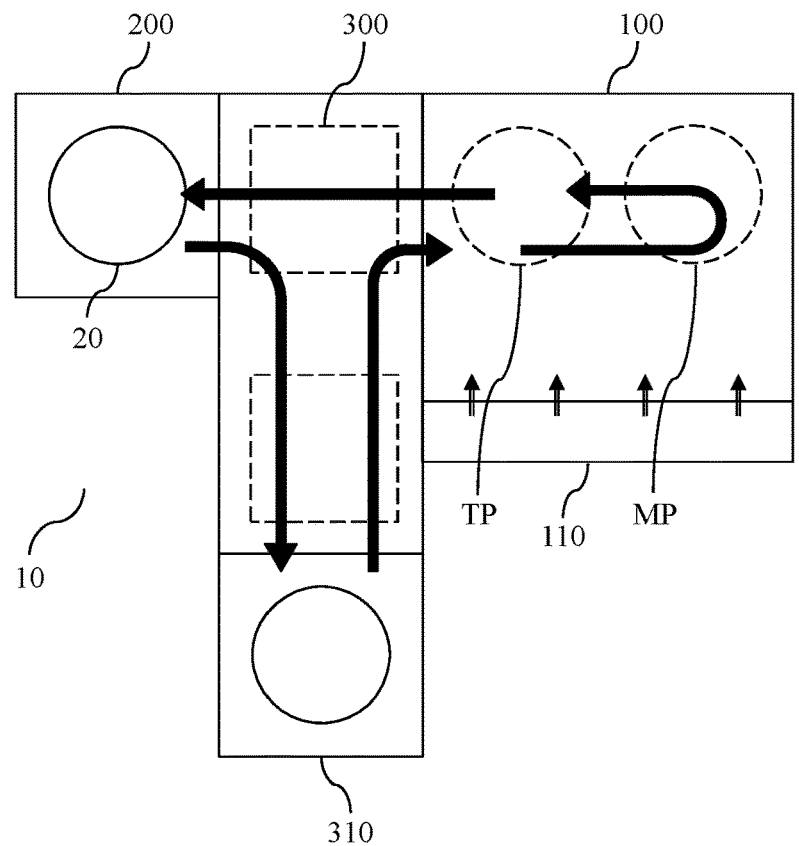
FIG. 1 is a schematic top view illustrating a constituent of an examination device 10 according to a first embodiment.

FIG. 1 is a schematic top view illustrating a constituent of an examination device 10 according to a first embodiment of the present invention. When a cartridge 200 on which a semiconductor wafer 20 as a substrate is mounted is mounted on the examination device 10, the semiconductor wafer 20 is introduced into the examination device 10 by a handling mechanism 300, and a prealigner 310 performs alignment of the semiconductor wafer 20 and the like. The semiconductor wafer 20 is then transported to an inspection chamber 100. The inspection chamber 100 receives the semiconductor wafer 20 at a transfer position (TP), moves the semiconductor wafer 20 to a measurement position (MP), and starts the inspection of the semiconductor wafer 20. After that, the entire surface of the semiconductor wafer 20 is inspected as the semiconductor wafer 20 is translated while rotated from the MP position to the TP position, and after the inspection is completed, the semiconductor wafer 20 is transferred to the handling mechanism 300 at the TP position and collected in the cartridge 200. A gas supply device 110 supplies a clean airflow to the inside of the inspection chamber 100.

Figure 2:
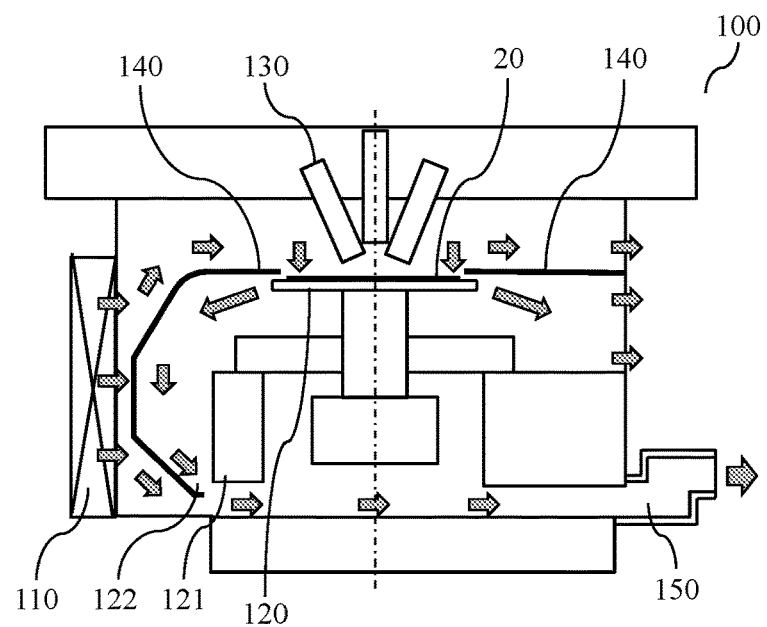
FIG. 2 is a perspective side view illustrating an internal configuration of an inspection chamber 100.

FIG. 2 is a perspective side view illustrating an internal configuration of the inspection chamber 100. FIG. 2 illustrates a state in which the semiconductor wafer 20 is at the measurement position MP. The semiconductor wafer 20 is placed on a stage 120. On the stage 120, a stage mechanism 121 can translate the semiconductor wafer 20 between the transfer position TP and the measurement position MP, and rotate the semiconductor wafer 20 below an optical inspection unit 130. The optical inspection unit 130 inspects a surface condition of the semiconductor wafer 20. With this configuration, the entire surface of the semiconductor wafer 20 is inspected as the stage 120 is translated while rotated from the MP position to the TP position.

From the side (the side of the stage 120) of the inspection chamber 100, the gas supply device 110 provides a clean airflow. The gas supply device 110 can be configured by, for example, a fan filter unit (FFU). The FFU sucks outside air from an attached wall, cleans the air and converts the air into a parallel airflow. The gas supply device 110 supplies the parallel airflow of the clean air to the inspection chamber 100.

A rectifying plate 140 is disposed between a supply port from which the gas supply device 110 supplies an airflow and the stage 120. The rectifying plate 140 guides a part of the airflow supplied by the gas supply device 110 to above the stage 120, and is disposed at a position at which the rectifying plate 140 blocks the space between the supply port of the gas supply device 110 and the stage 120 so that an airflow does not directly hit the semiconductor wafer 20. In contrast, due to the rotation of the stage 120, a swirling flow having a high flow velocity is discharged from the outer peripheral portion of the stage 120. The rectifying plate 140 has a role of guiding the airflow guided to above the stage 120 to move downward of the stage 120 through a gap between the rectifying plate 140 and the outer periphery of the stage 120 by the action of the swirling flow from the outer peripheral portion of the stage 120. Furthermore, the airflow guided to the inside of the rectifying plate 140 is guided to move downward of the inspection chamber 100. A narrow gap 122 is provided between the rectifying plate 140 and the stage mechanism 121, and the space inside the rectifying plate 140 becomes negative pressure due to the Venturi effect. Accordingly, the airflow discharged from the swirling flow is efficiently guided to move downward of the inspection chamber 100. Further, the rectifying plate 140 guides a part of the airflow supplied by the gas supply device 110 to move downward of the inspection chamber. The airflow guided to move downward of the inspection chamber and further downward of the stage mechanism 121 is discharged to the outside of the inspection chamber 100 from an exhaust port 150 disposed below the inspection chamber 100. The rectifying plate 140 can also be disposed on the opposite side of the gas supply device 110 as viewed from the stage 120. The airflow which passes from the gas supply device 110 to the optical inspection unit 130 passes through the upper side of the rectifying plate and is discharged to the outside of the inspection chamber 100. Further, the airflow guided to move downward of the stage 120 (opposite side of the gas supply device 110) from the opening of the rectifying plate 140 through the gap between the rectifying plate 140 and the outer periphery of the stage 120 is discharged to the outside of the inspection chamber 100 by passing through the lower side of the rectifying plate.

Figure 3A:
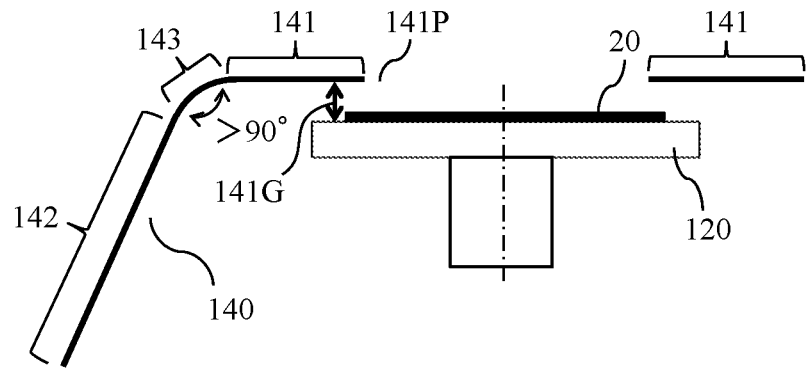
FIG. 3A is a diagram explaining the arrangement of a rectifying plate 140.
Figure 3B:
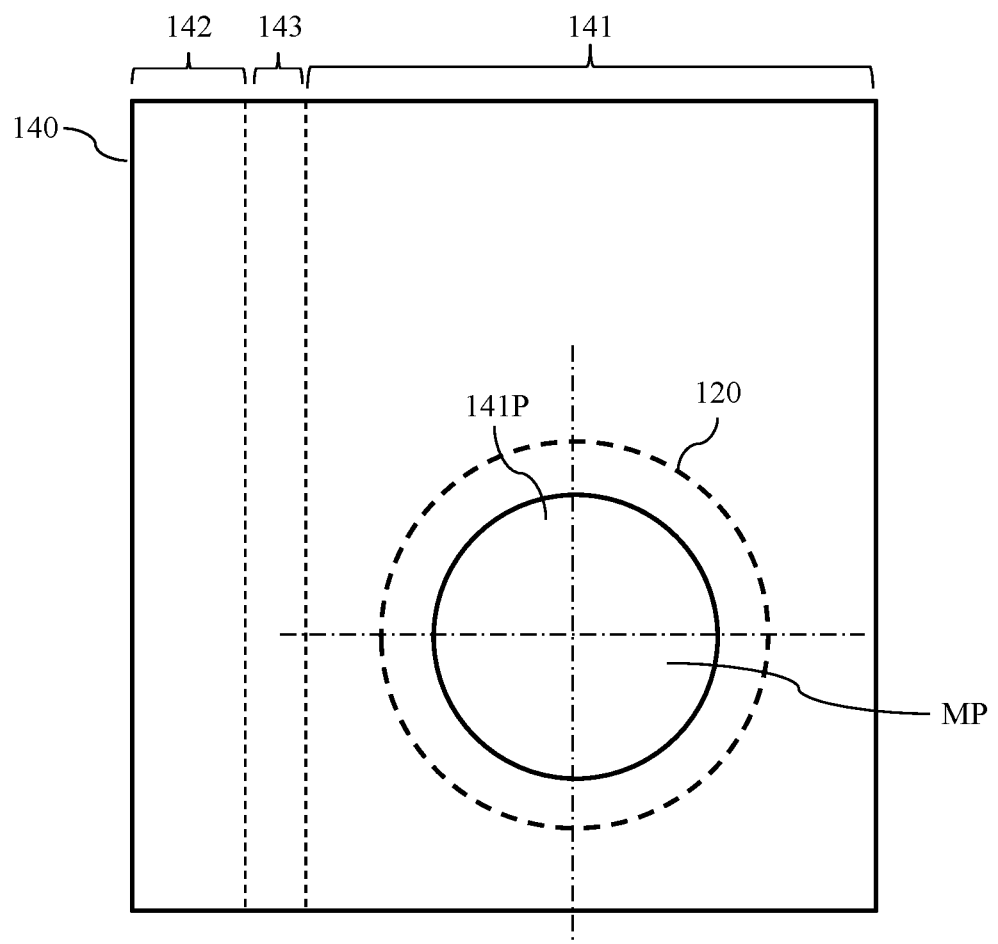
FIG. 3B is a schematic top view illustrating the arrangement of the rectifying plate 140.

FIGS. 3A and 3B are diagrams explaining the arrangement of the rectifying plate 140. FIG. 3A is an enlarged side view of the periphery of the stage 120 in FIG. 2. FIG. 3B is a top view of the rectifying plate 140 as viewed from above. The rectifying plate 140 is composed of a first part 141, a second part 142, and a third part 143 having a curvature connecting both parts. The first part 141 is disposed with a gap 141G from the upper surface of the stage 120. Furthermore, the first part 141 has a circular opening 141P concentric with the stage 120 at the MP position. When projected from above, the opening 141P is disposed at a position where a part of the upper surface of the stage 120 and the first part 141 overlap with each other at the outer peripheral portion. Furthermore, it is desirable that the opening 141P overlap with or be substantially equal to a part of the upper surface of the semiconductor wafer 20. The second part 142 guides the airflow from the gas supply device 110 to the first part 141 and further to above the stage 120, and is disposed at a position at which the second part 142 blocks the space between the supply port of the gas supply device 110 and the stage 120 so that an airflow does not directly hit the semiconductor wafer 20. It is desirable that the second part 142 further extend below the bottom surface of the stage 120. The third part 143 is a part connecting the first part 141 and the second part 142 with a continuous curve, and the magnitude of the curvature is determined by a space distance between the second part 142 and the gas supply device 110. A gap is provided between the first part 141 and the upper surface of the stage 120, and between the second part 142 and the side end portion of the stage 120. The angle formed by the first part 141 and the second part 142 is an obtuse angle of 90° or more. Details of the gap and angle will be described later.

Figure 4A:
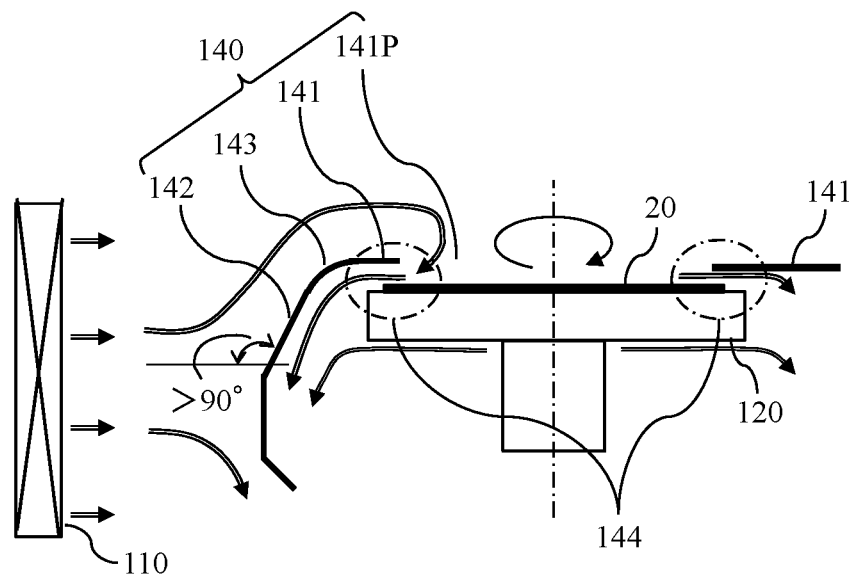
FIG. 4A is a diagram explaining an airflow around the rectifying plate 140.
Figure 4B:
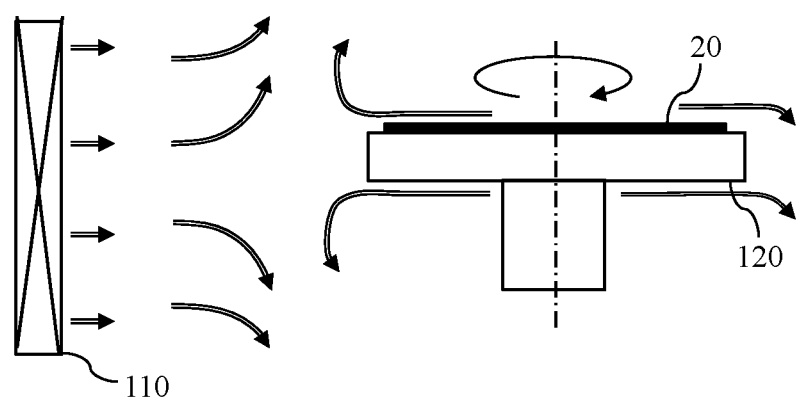
FIG. 4B is a diagram explaining an airflow around the rectifying plate 140.
Figure 4C:
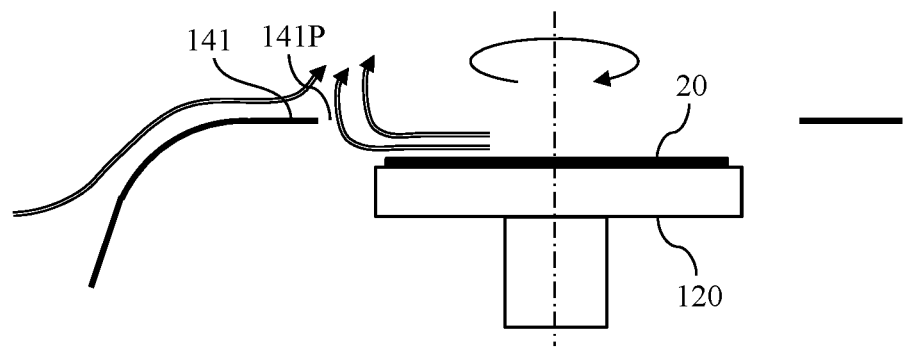
FIG. 4C is a diagram explaining an airflow around the rectifying plate 140.
Figure 4D:
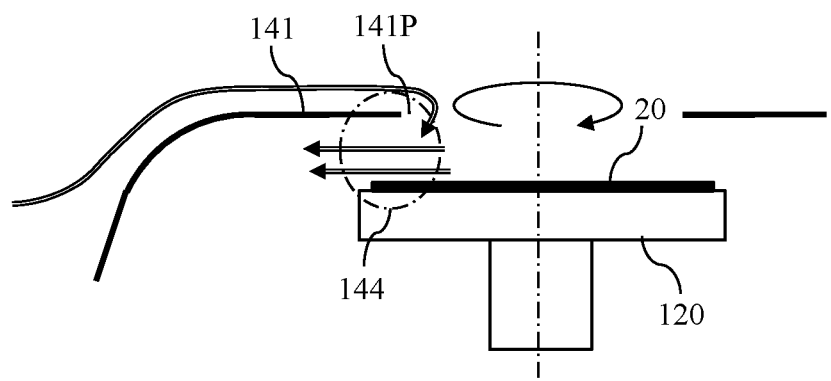
FIG. 4D is a diagram explaining an airflow around the rectifying plate 140.

Next, the action and effect of the rectifying plate will be described with reference to FIGS. 4A to 4D. FIG. 4A is a view for explaining an airflow around the rectifying plate 140, FIG. 4B is a side view for explaining an airflow above the semiconductor wafer 20 in a case where the rectifying plate 140 is not present, FIG. 4C is a side view illustrating the airflow above the semiconductor wafer 20 in a case where the rectifying plate 140 and the semiconductor wafer 20 do not overlap with each other, and FIG. 4D is a side view of the airflow above the semiconductor wafer 20 in a case where the edges of the rectifying plate 140 and the semiconductor wafer 20 are aligned. For convenience of description, some symbols and members are omitted.

In FIG. 4A, the horizontal airflow supplied by the gas supply device 110 is guided to above the stage 120 and the semiconductor wafer 20 by a continuous curved shape from the second part 142 to the first part 141 through the third part 143. In contrast, due to the rotation of the stage 120, the airflow from the upper surface and the lower surface of the stage is transported to the outer periphery of the stage 120, and a swirling flow is generated on the outer periphery. By this swirling flow, the airflow guided to above the stage 120 and the semiconductor wafer 20 is drawn in, and the airflow is released in the outer peripheral direction with momentum by a swirling inertial force. Since this airflow may contain dust generated from the mechanism of the stage 120 or the like, it is necessary to reliably guide the airflow to move downward of the stage 120 without circulating the airflow to above the semiconductor wafer 20.

In FIG. 4A, the opening 141P is disposed so that the first part 141 of the rectifying plate overlaps with a part of the stage 120 at the outer peripheral portion while having a gap with the upper surface of the stage 120. By this arrangement, a negative pressure region 144 having a lower pressure than the surroundings is generated in the space between the outer peripheral portion of the stage 120 and the first part 141 due to the swirling flow of the stage 120. This negative pressure is generated by Bernoulli's principle as the airflow velocity becomes higher than that of the surroundings due to the rotation of the stage 120 in the space between the first part 141 of the rectifying plate and the upper surface of the stage 120.

Due to the action of the negative pressure region 144, the airflow reaching above the stage 120 and the semiconductor wafer 20 is drawn into the gap between the first part 141 and the upper surface of the stage 120 and is further released in the outer peripheral direction with momentum by the swirling inertial force. This airflow is further smoothly guided in the direction of the second part 142 on the lower side of the third part 143 of the rectifying plate, and further guided to the gap between the second part 142 and the side end portion of the stage 120. In this manner, the airflow is guided to move downward of the stage 120 without forming a stagnation point. Since the airflow in the horizontal direction supplied by the gas supply device 110 is blocked by the second part 142, it is unlikely that the airflow guided to move downward of the stage 120 is hoisted again to above the semiconductor wafer 20.

In addition to this, a swirling flow is also generated on the lower surface of the stage 120, and an airflow due to the swirling inertial force toward the outer periphery is generated. This airflow moves toward the second part 142 like the airflow above the upper surface of the semiconductor wafer 20. However, since the part has an inclined shape that guides the airflow to move downward, the airflow from the lower surface of the stage 120 is guided to move downward of stage 120 without obstructing the airflow from the upper surface of the stage 120. The stage 120 has a mechanical part and the like, and there is a possibility that a foreign matter such as dust is generated. However, the airflow from the stage 120 is guided to move downward of the stage 120 without circulating to above the semiconductor wafer 20 and discharged from the exhaust port 150. Accordingly, the stability and reliability of the examination device 10 against foreign matter adhesion and contamination can be improved.

For comparison, as shown in FIG. 4B, in a case where there is no rectifying plate that guides the swirling flow generated by the rotation of the stage 120, the airflow released to the outer periphery of the stage 120 by a centrifugal force collides with the airflow from the gas supply device 110 in the outer side portion of the stage 120, and shows a behavior of generating a vortex above or below the stage 120. For this reason, in a case where a foreign matter such as dust is generated from the mechanism of the stage 120 or the like, there is a possibility that the foreign matter flies back to above the stage 120 in the airflow and adheres to the semiconductor wafer 20.

Further, as shown in FIG. 4C, even if a rectifying plate that guides the flow of the swirling flow generated by the rotation of the stage 120 is installed, in a case where the opening 141P provided in the first part 141 of the rectifying plate is large and the first part 141 of the rectifying plate does not overlap with the outer peripheral portion of the stage 120, there is no airflow drawing action by the negative pressure region 144 as in FIG. 4A. For this reason, there is a possibility that the airflow discharged from the outer peripheral portion of the stage 120 collides with the airflow from the gas supply device 110 in the outer peripheral portion of the stage 120 and is rapidly decelerated, drifts on the outer periphery, and returns to above the surface of the semiconductor wafer again.

In contrast, as shown in FIG. 4D, the rectifying plate that guides the flow of the swirling flow generated by the rotation of the stage 120 is installed, and the opening 141P is disposed so that the first part 141 of the rectifying plate overlaps with the outer peripheral portion of the stage 120, so that the airflow above the stage 120 is drawn in by the negative pressure region 144 and released in the outer peripheral direction. From this, it is shown to be important to dispose the rectifying plate that guides the flow of the swirling flow generated by the rotation of the stage 120 so as to generate the negative pressure region 144.

Further, in FIG. 4A, regarding the shape of the rectifying plate 140, the second part 142 on the upstream side is configured with an obtuse angle larger than 90° with respect to the parallel airflow from the gas supply device 110, the third part 143 is provided between the second part 142 and the first part 141 constituting the downstream side, and the shape of the third part 143 is configured with a continuous curve (for example, an arc shape). The function and effect of this shape are explained by FIGS. 5A and 5B.

Figure 5A:
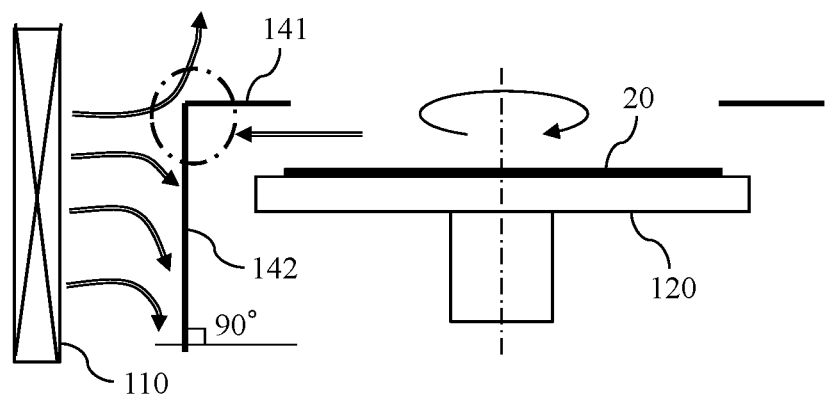
FIG. 5A illustrates a configuration example in which the angle formed by a first part 141 and a second part 142 is a right angle as a comparative example.
Figure 5B:
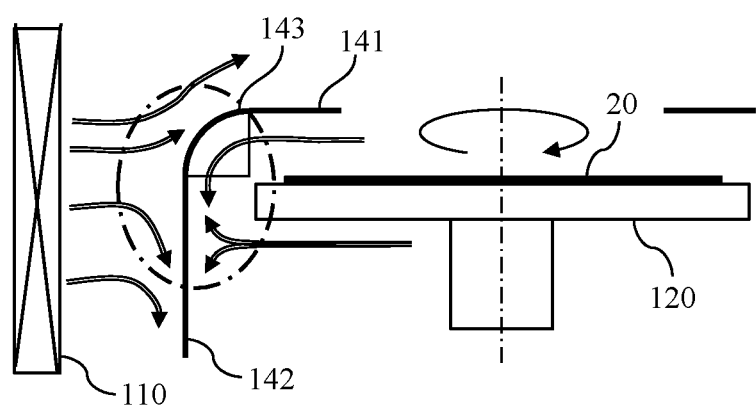
FIG. 5B illustrates a configuration example in which the angle formed by the first part 141 and the second part 142 is a right angle as a comparative example.

FIGS. 5A and 5B illustrate a configuration example in which the angle formed by the first part 141 and the second part 142 is a right angle as a comparative example. In FIG. 5A, the third part 143 is not provided, and the first part 141 and the second part 142 are directly connected. In FIG. 5B, the third part 143 connects the first part 141 and the second part 142 with a continuous curve. As described above, in the configuration example of the first embodiment shown in FIG. 4A, the angle formed by the first part 141 and the second part 142 is an obtuse angle, and the third part 143 connects them with a continuous curve. In contrast, in a case where the angle between both parts is formed at a right angle as shown in FIG. 5A, the airflow guided to the corner enclosed by the alternate long and short dash line may cause turbulence and obstruct the airflow moved downward of the stage 120. This turbulence at the corner is mitigated by providing the third part 143 as shown in FIG. 5B. However, the airflow on the lower surface of the stage 120 collides with the second part 142 at a right angle, resulting in an unstable state of the airflow. By the above, the downward flow from the upper surface of the semiconductor wafer 20 is also made unstable. Therefore, it can be said that the configurations shown in FIGS. 5A and 5B are not desirable.

Figure 5C:
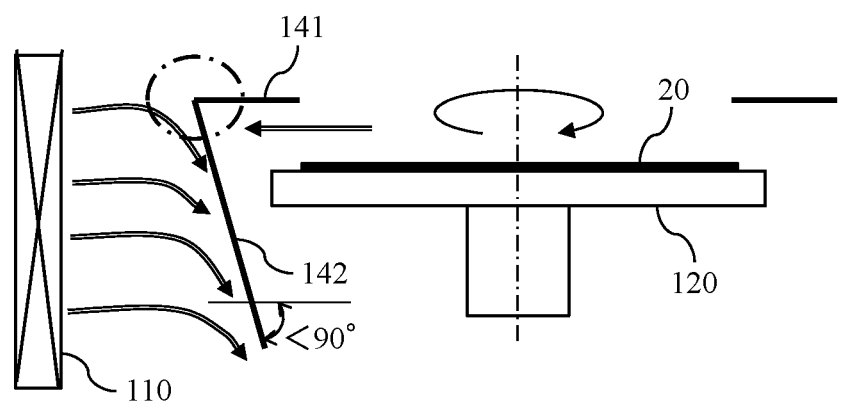
FIG. 5C illustrates a configuration example in which the angle formed by the first part 141 and the second part 142 is an acute angle as a comparative example.
Figure 5D:
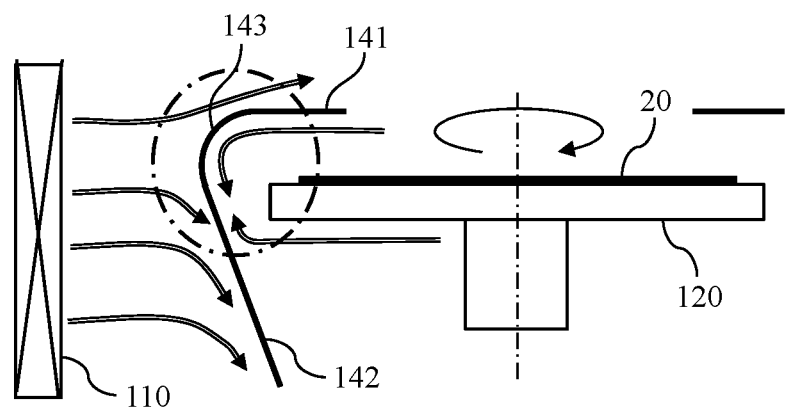
FIG. 5D illustrates a configuration example in which the angle formed by the first part 141 and the second part 142 is an acute angle as a comparative example.

FIGS. 5C and 5D illustrate a configuration example in which the angle formed by the first part 141 and the second part 142 is an acute angle as a comparative example. FIG. 5C shows the case where the third part 143 is not provided, and FIG. 5D shows the case where the third part 143 is provided. In this case as well, in addition to the fact that there is a possibility that turbulence occurs at the corner as in FIGS. 5A and 5B, and the force for guiding the airflow to move downward of the stage 120 is weak as compared with that in FIGS. 4 and 5A and 5B. Furthermore, when the airflow on the lower surface of the stage 120 reaches the second part, since the part has an inclined shape by which the airflow is guided to above the stage, an action of obstructing the downward flow from the semiconductor wafer 20 is generated. Such a configuration is even less desirable than that in FIGS. 5A and 5B.

The configuration and shape of the rectifying plate in FIGS. 4, 5A, and 5B will be considered from the viewpoint of the flow of the airflow from the gas supply device 110.

Regarding the parallel airflow supplied from the gas supply device 110 on the front side of the rectifying plate, increasing a flow rate of the airflow guided to the upper surface portion of the semiconductor wafer and guiding the airflow to move downward from above the stage in a laminar flow state without generating turbulence are necessary. This is because, when the turbulence occurs, it becomes impossible to allow the airflow to flow smoothly from the upstream side to the downstream side, a vortex is developed along with the turbulence, and there is a possibility that a foreign matter discharged to the downstream side returns to the upstream side and stays on the semiconductor wafer 20.

In order to maintain the laminar flow without generating turbulence, it is important to prevent the boundary layer from peeling off on the rectifying plate for the airflow guided by the rectifying plate 140. The boundary layer is a layer of a region having velocity distribution of the airflow in a direction away from the rectifying plate. When the boundary layer is peeled off, turbulence is generated because the velocity distribution of the airflow near the rectifying plate is disturbed. In order to suppress the peeling off of the boundary layer, it is necessary to reduce a shape change rate of the rectifying plate with respect to the flow direction of the airflow and make the shape have no discontinuous portion and low resistance to the airflow.

In response to this requirement, in FIG. 4A, most of the parallel airflow sent out from the gas supply device 110 flows to above the semiconductor wafer 20 by the rectifying plate 140. Further, the shape of the third part 143 of the rectifying plate is configured to be connected by a continuous curve (for example, an arc shape), and the airflow is guided to above the semiconductor wafer 20 without peeling off of the boundary layer and generation of turbulence.

In contrast, in FIGS. 5A and 5B, the parallel airflow flowing above the semiconductor wafer 20 is small in amount, and the angle formed by the first part 141 and the second part 142 of the rectifying plate 140 is a right angle. For this reason, there is a possibility that turbulence due to peeling off of the boundary layer is generated in the vicinity. In FIGS. 5C and 5D, the second part 142 of the rectifying plate has an acute angle with respect to the direction of the parallel airflow, and peeling off of the boundary layer is likely to occur at this part and the airflow hitting this part flows downward. For this reason, the parallel flow flowing above the semiconductor wafer 20 is smaller in amount than that in the structure in FIGS. 5A and 5B.

From the above, the shape of the rectifying plate 140 is preferably that of the configuration of FIG. 4A, that is, the second part 142 on the upstream side is configured with the obtuse angle shape larger than 90° with respect to the parallel airflow, and the shape between the part and the first part 141 constituting the downstream side is a shape without discontinuities (for example, an arc shape). With the above configuration, the parallel airflow in the vicinity of the rectifying plate flows to the downstream side without being separated by the rectifying plate, so that there is a less possibility that a foreign matter discharged to the downstream side returns to the upstream side due to the generation of turbulence and adheres onto the semiconductor wafer 20.

Next, the distance of the gap between the first part 141 of the rectifying plate and the upper surface of the stage 120 in FIG. 4A and the overlap between the first part 141 of the rectifying plate and the outer peripheral portion of the stage 120 will be considered. As described in FIG. 4A, by this arrangement, the negative pressure region 144 having a lower pressure than the surroundings is generated in the space between the outer peripheral portion of the stage 120 and the first part 141 due to the swirling flow of the stage 120.

Figure 6A:
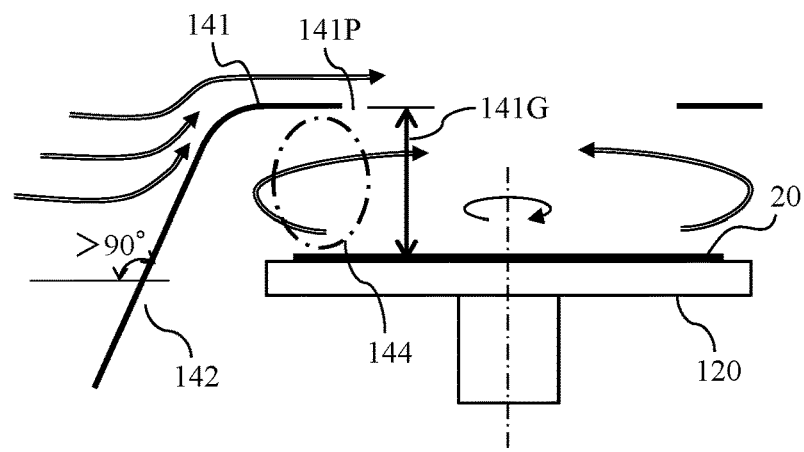
FIG. 6A illustrates a configuration example in which the distance of a gap between the first part 141 and the upper surface of a stage 120 is wider than that in FIG. 4A as a comparative example.

FIG. 6A illustrates a configuration example in which the distance of the gap 141G between the first part 141 of the rectifying plate and the upper surface of the stage 120 is wider than that in FIG. 4A as a comparative example. Similar to FIG. 4A, the size of the opening 141P is disposed so that the first part 141 of the rectifying plate and the outer peripheral portion of the stage 120 overlap with each other. In this configuration example, there is a higher possibility that the airflow is hoisted in the space between the first part 141 and the upper surface of the stage 120 and returns to above the semiconductor wafer 20. Furthermore, the negative pressure generated by the large gap between the end portion of the stage 120 and the first part 141 is also reduced, and the effect of drawing in the airflow is reduced. Therefore, it is desirable that the distance of the gap between the first part 141 of the rectifying plate and the upper surface of the stage 120 be set to an appropriate value so that the hoisted airflow as shown in FIG. 6A can be suppressed and negative pressure can be generated.

Figure 6B:
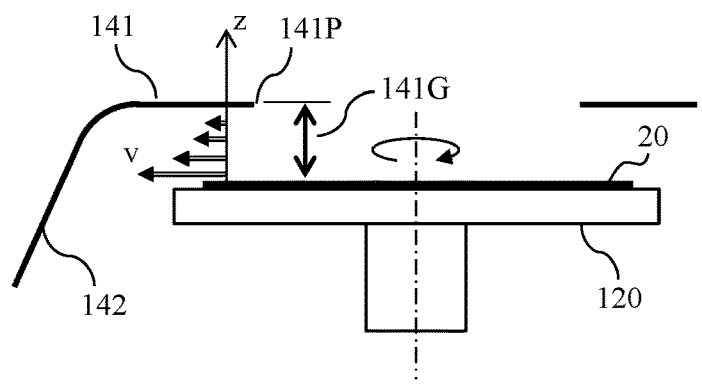
FIG. 6B illustrates the velocity distribution of an airflow near the stage 120.

The distance of the gap 141G in FIG. 6A can be considered from the velocity distribution in the vicinity of the semiconductor wafer 20 of the swirling flow. FIG. 6B illustrates the velocity distribution in the vertical direction in the vicinity of the semiconductor wafer of the swirling flow generated by the rotation of the stage 120. As the stage 120 rotates, the swirling flow is generated above the stage 120 and the semiconductor wafer 20. Here, in the velocity distribution in the height direction (Z direction away from the semiconductor wafer 20), the velocity is equal to the rotation speed of the semiconductor wafer 20 on the outermost surface of the semiconductor wafer 20, and decreases to become zero as the swirling flow is more away in the vertical direction from the surface of the semiconductor wafer 20. As a result of numerical analysis, the height having the velocity distribution was about 3 mm under the condition that the semiconductor wafer of φ300 mm is rotated at 50 Hz (3000 rpm). Therefore, if a gap of at least 3 mm, or desirably twice as large, around 6 mm, is provided as the gap 141G between the first part 141 of the rectifying plate and the stage 120 for drawing in the air flowing above the semiconductor wafer 20, the purpose can be achieved.

Figure 6C:
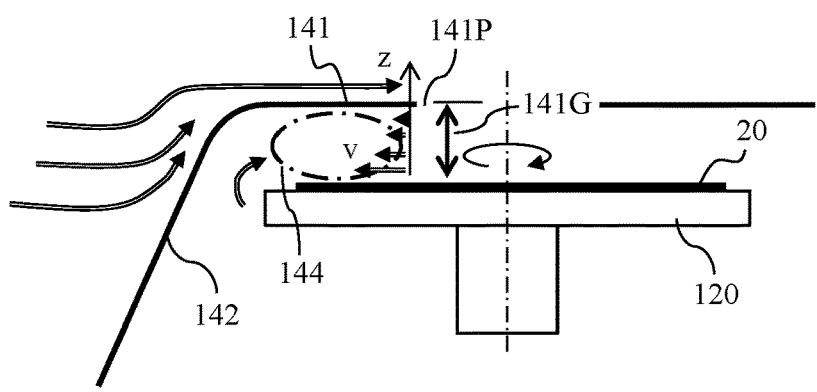
FIG. 6C illustrates a configuration example in which the overlap between the first part 141 and the stage 120 is longer than that in FIG. 4 as a comparative example.

As a comparative example, FIG. 6C illustrates a configuration example in which the opening 141P of the rectifying plate is made smaller and the overlap between the first part 141 and the outer peripheral portion of the stage 120 is wider than that in FIG. 4A. In this configuration example, since the overlapping region between the stage 120 and the first part 141 is wide, the negative pressure generated in the negative pressure region 144 becomes smaller in the negative direction (the absolute value becomes larger). For this reason, a pressure difference with the surroundings becomes large, and a force for drawing in the airflow from the outer peripheral portion of the stage 120 is generated. In contrast, the drawing in of the airflow from above the semiconductor wafer 20 becomes less effective because the velocity of the swirling flow decreases as the swirling flow approaches the center of the stage 120. Due to these actions, the airflow tends to stay in the vicinity of the stage 120. Therefore, it is desirable to set the overlap between the opening of the first part 141 of the rectifying plate and the outer peripheral portion of the stage 120 to an appropriate value.

As a result of numerical analysis, under the condition that a semiconductor wafer of φ300 mm rotates at 50 Hz (3000 rpm), the difference in negative pressure from the surroundings reached 5 Pa when the overlap width was 3 mm and 20 Pa or more when the overlap width was 30 mm (in a case where the gap between the first part 141 of the rectifying plate and the stage 120 is 8 mm). Therefore, if the width of the overlap between the first part 141 of the rectifying plate and the outer peripheral portion of the stage 120 is set to about 3 mm to a maximum of 30 mm, desirably about ½ times as large, 15 mm, the purpose can be achieved.

First, in the description of the arrangement of the rectifying plate 140 in FIG. 3, the first part 141 of the rectifying plate 140 is provided with the circular opening 141P at the measurement position MP, and the size of the opening is smaller than that of the stage 120. The first part 141 is arranged at a position overlapping with the outer peripheral portion of the stage 120 while having a gap with the upper surface of the stage 120 when viewed from the side, and is formed to have a region overlapping with the stage 120 in the outer peripheral portion when viewed from above. Here, specific numerical values regarding the overlap between the upper surface of the stage 120 and the first part 141, the gap 141G between the upper surface of the stage 120 and the first part 141, and the size of the opening 141P of the rectifying plate 140 were examined in FIGS. 6A, 6B, and 6C based on airflow analysis. As a result, it was found that the effect of the present invention is preferably exhibited under the following conditions in a case where the rotation speed of the stage 120 is several thousand rpm:

Overlap of the upper surface of the stage 120 and the first part 141: 3 mm to 30 mm, Gap between the upper surface of the stage 120 and the first part 141: 3 mm to 30 mm, more desirably, Overlap of the upper surface of the stage 120 and the first part 141: 3 mm to 15 mm, Gap between the upper surface of the stage 120 and the first part 141: 6 mm to 30 mm.

Generally, in fluid analysis of an airflow and the like, the characteristics of flow are often expressed by a dimensionless quantity and a ratio using typical dimensions, not by the value itself of the size of the space through which the fluid flows. For example, the Reynolds number is expressed by $R=LU/v$ (L: typical length, U: typical flow velocity, v: kinematic viscosity of fluid), is a dimensionless quantity defined by the ratio of an inertial force and a viscous force, and is used to characterize flow, such as laminar flow and turbulent flow. In the present embodiment, by using the diameter of the stage 120 as a representative dimension, the overlap and the gap of a portion through which an airflow flows can be represented by the ratio to the diameter of the stage 120. That is, the effect of the present invention is preferably exhibited under the following conditions in a case where the rotation speed of the stage 120 is several thousand rpm:

Overlap of the upper surface of the stage 120 and the first part 141: 1% to 10% of the diameter of the stage 120, Gap of the upper surface of the stage 120 and the first part 141: 1% to 10% of the diameter of the stage 120, Diameter of the opening of the rectifying plate 140: 98% to 80% of the diameter of the stage 120, more desirably, Overlap of the upper surface of the stage 120 and the first part 141: 1% to 5% of the diameter of the stage 120, Gap of the upper surface of the stage 120 and the first part 141: 2% to 5% of the diameter of the stage 120, Diameter of the opening of the rectifying plate 140: 98% to 90% of the diameter of the stage 120.

Note that the diameter of the stage 120 is set to 300 mm, which is the same as the diameter of the semiconductor wafer 20. Actually, since there is a clamp mechanism and the like of the semiconductor wafer on the outer peripheral portion of the stage 120, the diameter of the stage 120 may be larger than the diameter of the semiconductor wafer 20. However, even in a case where the diameter becomes larger to, for example, about 350 mm or about 400 mm, the above range can be applied.

First Embodiment: Summary

The examination device 10 according to the first embodiment includes the rectifying plate 140 disposed between the gas supply device 110 and the stage 120, the first part 141 covers a part of the upper surface of the stage 120 with the outer peripheral portion while having a gap with the stage 120, and the second part 142 guides the airflow supplied by the gas supply device 110 to the first part 141 and further to above the stage 120. In this manner, the airflow that reaches above the stage 120 and the semiconductor wafer 20 from the gas supply device 110 is drawn in by the swirling flow due to the rotation of the stage 120, released in the outer peripheral direction with momentum, and discharged below the stage 120 by the first part 141, the third part 143, and the second part 142 of the rectifying plate 140.

Further, the second part 142 blocks the airflow supplied by the gas supply device 110 so that the airflow does not directly hit the semiconductor wafer 20. In this manner, when the airflow is guided to move downward of the stage 120, the possibility that the airflow is hoisted below the stage 120 by a new airflow supplied from the gas supply device 110 can be suppressed. Therefore, it is possible to reliably guide the airflow that may contain a foreign matter such as dust generated from the mechanism and the like of the stage 120 to move downward of the stage 120. That is, the possibility that the semiconductor wafer 20 is contaminated by the adhesion of a foreign matter due to the hoisted airflow can be suppressed.

Second Embodiment

Figure 7A:
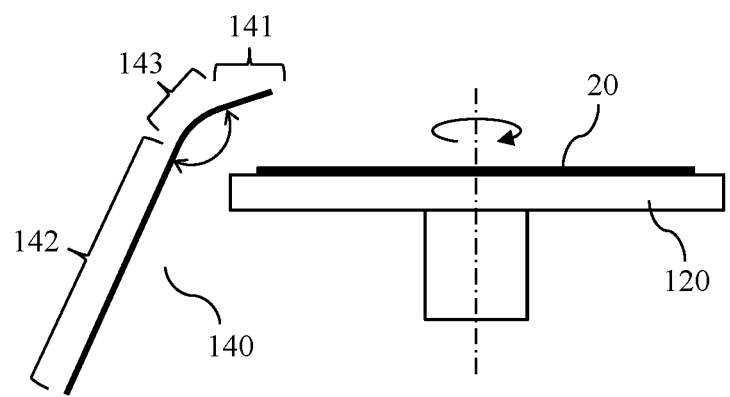
FIG. 7A illustrates a configuration example of the rectifying plate 140 according to a second embodiment.

FIG. 7A illustrates a configuration example of the rectifying plate 140 according to a second embodiment of the present invention. Since the parts other than the rectifying plate 140 are the same as those in the first embodiment, a difference regarding the rectifying plate 140 will be mainly described below. In the second embodiment, the angle formed by the first part 141 and the second part 142 is an obtuse angle and is larger than that of the first embodiment. In the second embodiment as well, the action of guiding the airflow to move downward of the stage 120 is generated as in the first embodiment. However, the second embodiment differs from the first embodiment in a point described below.

In order to keep the periphery of the semiconductor wafer 20 clean, it is desirable to reliably guide the clean airflow from above the semiconductor wafer 20 to move downward of the stage 120. As shown in FIG. 6, in the second embodiment, the distance between the first part 141 and the upper surface of the stage 120 is configured to gradually decrease from the center of the upper surface of the stage 120 toward the outer periphery (that is, the first part 141 is inclined with respect to the upper surface of the stage 120). In this manner, the negative pressure that draws in the airflow to below the stage 120 gradually increases from the center of the upper surface of the stage 120 toward the outer periphery. That is, since the action of guiding the airflow to move downward of the stage 120 is strong as compared with that of the first embodiment, the clean airflow can be more reliably guided from above the semiconductor wafer 20 to move downward of the stage 120 than in the first embodiment.

Note that if the opening where the airflow enters below the first part 141 is too large, the same hoisting airflow as in FIG. 5C is likely to occur. Therefore, it is desirable to adjust the position of the entire rectifying plate 140 as the first part 141 is inclined.

Third Embodiment

Figure 7B:
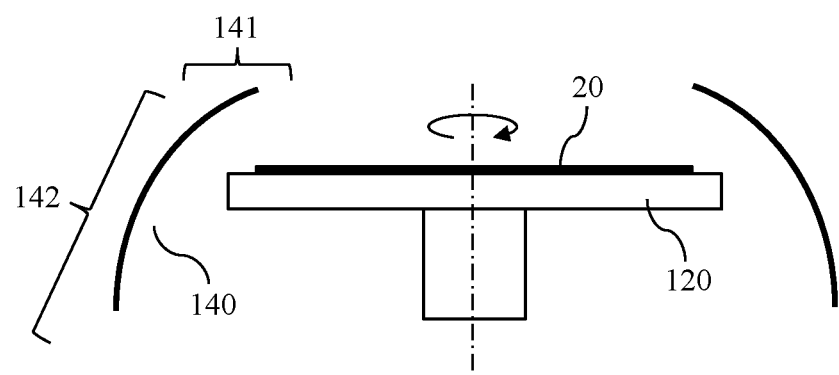
FIG. 7B illustrates a configuration example of the rectifying plate 140 according to a third embodiment.

FIG. 7B illustrates a configuration example of the rectifying plate 140 according to a third embodiment of the present invention. Since the parts other than the rectifying plate 140 are the same as those in the first embodiment, a difference regarding the rectifying plate 140 will be mainly described below. In the third embodiment, the rectifying plate 140 is curved in an arch shape. Of the arch, a portion that substantially overlaps with the upper surface of the stage 120 when projected onto a horizontal plane corresponds to the first part 141, and the rest corresponds to the second part 142.

In the third embodiment as well, as in the first embodiment, the action of guiding the clean airflow supplied by the gas supply device 110 from above the semiconductor wafer 20 to move downward of the stage 120 is generated. Further, as in the second embodiment, the distance between the first part 141 and the upper surface of the stage 120 gradually decreases from the center of the upper surface of the stage 120 toward the outer periphery. In this manner, as in the second embodiment, the action of guiding the airflow to move downward of the stage 120 becomes stronger.

Comparing the second and third embodiments, in the second embodiment, the pressure in the vicinity of the end portion of the stage 120 changes linearly according to the inclination of the first part 141. Accordingly, the pressure gradient is gentle. Therefore, it can be said that the possibility that vibration is generated due to a rapid pressure change is lower than that of the third embodiment. In contrast, in the second embodiment, since the corner portion exists between the first part 141 and the second part 142, there is a possibility that turbulence occurs at the corner portion.

Fourth Embodiment

Figure 8A:
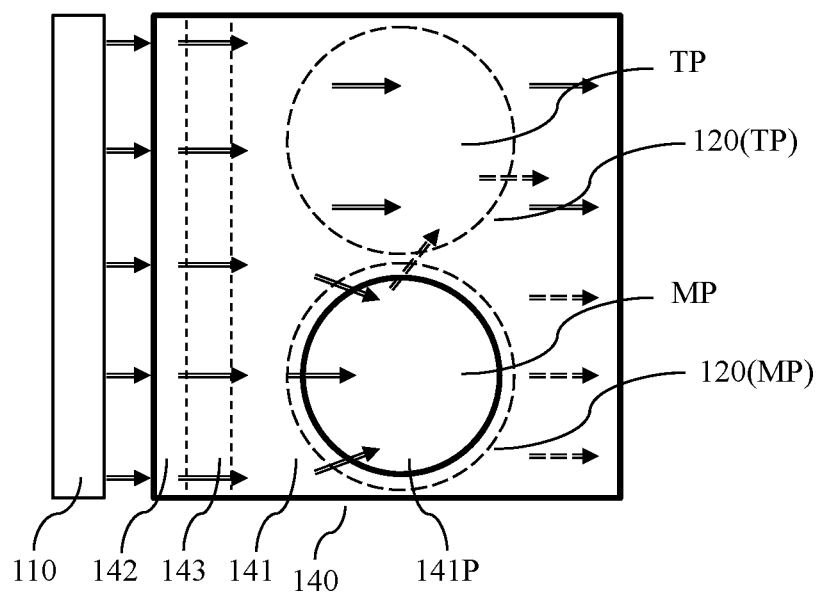
FIG. 8A illustrates an example in a case where the rectifying plate 140 has a circular opening as a configuration in a fourth embodiment.
Figure 8B:
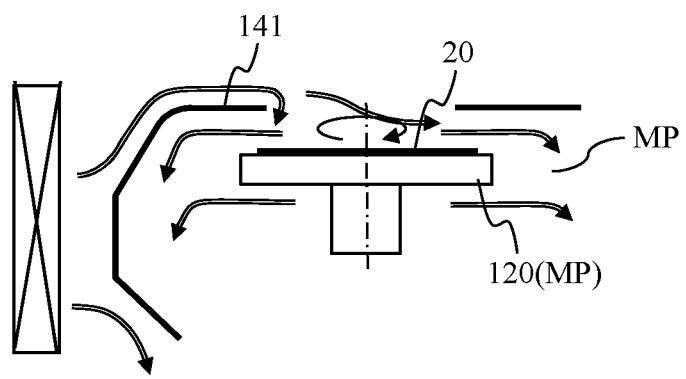
FIG. 8B illustrates an example in a case where the rectifying plate 140 has a circular opening as a configuration in the fourth embodiment.
Figure 8C:
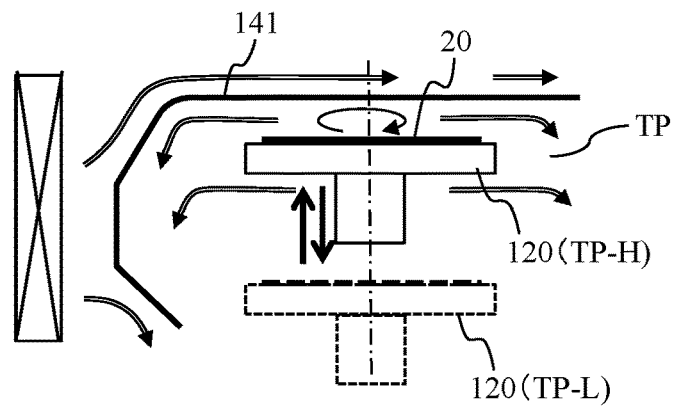
FIG. 8C illustrates an example in a case where the rectifying plate 140 has a circular opening as a configuration in the fourth embodiment.

Next, a result of examining the shape of the opening of the rectifying plate will be described. FIGS. 8A to 8E illustrate a fourth embodiment of the present invention. As in FIG. 3, FIG. 8A illustrates a top view of the rectifying plate, FIG. 8B illustrates a side view when the stage 120 is at the measurement position MP, and, furthermore, FIG. 8C illustrates a side view when the stage 120 is at the transfer position TP. Further, in the top view of the rectifying plate in FIG. 8A, positions 120 (MP) and 120 (TP) at the measurement position MP and the transfer position TP of the stage 120 are shown by a broken line. Further, the airflow on the upper surface of the rectifying plate 140 is shown by a solid line, and the airflow on the lower surface is shown by a broken line.

In FIG. 8A, the rectifying plate 140 is configured to be provided with a circular opening at the measurement position MP. The opening 141P is formed to have size smaller than the stage 120 (broken line at the measurement position MP in the diagram), and have a region where the rectifying plate 140 overlaps with the stage 120 in the outer peripheral portion. In this manner, at the measurement position MP shown in FIG. 8B, the rotation of the stage 120 causes the airflow to be drawn in at the outer peripheral portion of the stage 120 and discharged downward, so that the semiconductor wafer 20 placed on the stage 120 can be maintained to be clean.

In contrast, at the transfer position TP shown in FIG. 8C, the stage 120 performs not only rotation operation, but also vertical operation for placing and detaching and attaching the semiconductor wafer 20. Here, the vertical operation is performed while the rotation of the stage 120 is stopped. In FIG. 8C, the rotation operation of the stage 120 is indicated by a rotation arrow around the rotation axis, and the vertical movement is indicated by upward and downward arrows. However, these are not performed at the same time. Before the start of inspection, when the semiconductor wafer 20 is placed on the stage 120, the stage 120 is at a lower position 120(TP-L) (indicated by a broken line). The semiconductor wafer 20 is placed on the stage 120 by the handling mechanism 300 (not shown here), and after the handling mechanism retracts, the stage 120 rises to an upper position 120(TP-H). After that, as described in FIG. 2, the stage 120 and the semiconductor wafer 20 move to the MP position, and translationally move from the measurement position MP toward the transfer position TP while rotating, so that the entire surface of the semiconductor wafer 20 is inspected. Then, after the inspection is completed, the stage 120 returns to the TP position and the rotation of the stage 120 is stopped. After that, the stage 120 descends from the upper position 120(TP-H) to the lower position 120(TP-L) at the TP position, and the semiconductor wafer 20 is detached from and attached to the stage 120 by the handling mechanism 300.

Here, at the transfer position TP, as shown in FIGS. 8A and 8C, the rectifying plate is not provided with an opening above the stage 120. For this reason, the drawing effect of drawing in the airflow in the outer peripheral portion of the stage 120 is limited. When the stage 120 returns to the TP position after the inspection is completed, the effect of drawing in the airflow in the outer peripheral portion of the stage 120 at the MP position remains. In contrast, before the start of the inspection, it is difficult to obtain the effect of drawing in the airflow according to the present invention at the TP position. Immediately after the stage 120 rises to the upper position 120(TP-H), the effect of drawing in the airflow cannot be obtained because the stage 120 is not rotating. Furthermore, even in a case where the stage 120 starts rotating at the transfer position TP, since no opening is provided above the stage 120, no airflow is supplied from there. As shown in FIG. 8A, since the airflow is also supplied to the transfer position TP from the lower surface of the rectifying plate 140 through the opening 141P of the measurement position MP, the effect of drawing in the airflow by the rotation can be obtained even at the transfer position TP. However, the obtained effect is less than that at the measurement position MP.

Figure 8D:
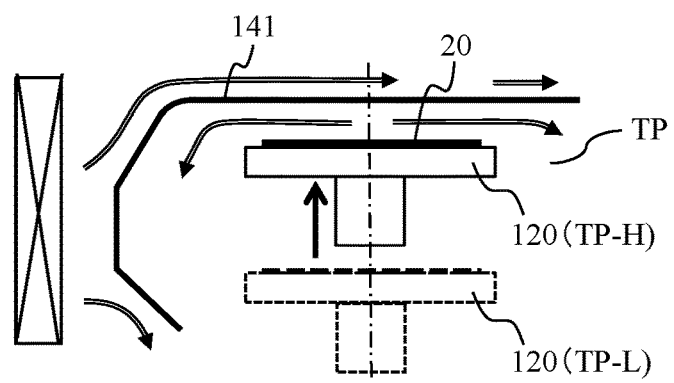
FIG. 8D illustrates an example in a case where the rectifying plate 140 has a circular opening as a configuration in the fourth embodiment.
Figure 8E:
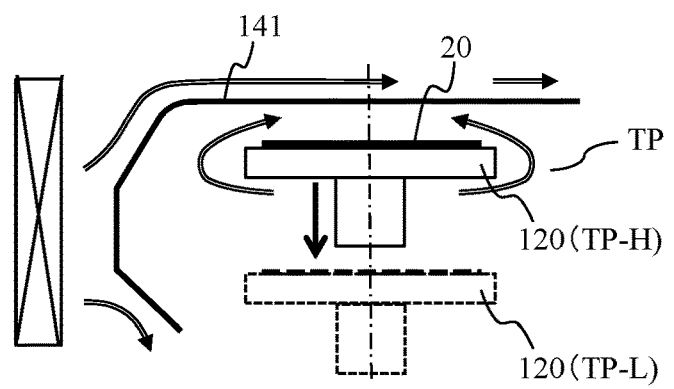
FIG. 8E illustrates an example in a case where the rectifying plate 140 has a circular opening as a configuration in the fourth embodiment.

Further, since no opening is provided above the stage 120, there is a possibility that the ascending and descending operation of the stage 120 affects the airflow around the semiconductor wafer 20. This state is schematically shown by FIGS. 8D and 8E. That is, as shown in FIG. 8D, in a case where the stage 120 rises, the air in the gap between the semiconductor wafer 20 and the first part 141 is compressed, and an airflow in the direction of being pushed out to the outer peripheral portion of the stage 120 and the semiconductor wafer 20 is generated. This pushed-out airflow is discharged below the stage 120 by the rectifying plate 140. However, as shown in FIG. 8E, in a case where the stage 120 descends, an airflow in the direction in which air is sucked from around the stage 120 and the semiconductor wafer 20 is generated in the gap between the semiconductor wafer 20 and the first part 141.

Here, as the airflow on the upper and lower surfaces of the rectifying plate 140 is shown in FIG. 8A, the clean airflow supplied from the gas supply device 110 flows from the opening at the measurement position MP of the rectifying plate 140 toward the stage 120 (TP) around the stage 120 (TP) even at the transfer position TP. Therefore, even in a case where the effect of drawing in the airflow is restricted at the transfer position TP as described above, or in a case where the airflow is pushed out or sucked by the vertical movement of the stage 120, a foreign matter does not immediately adhere to the semiconductor wafer 20. However, the possibility that a probability of a foreign matter adhering to the semiconductor wafer 20 increases due to partial generation of turbulence of the airflow and the hoisting of a foreign matter from the mechanical part of the stage 120 cannot be completely eliminated. This problem can be improved by the shape of the opening of the rectifying plate. A specific example will be described in a fifth embodiment.

Fifth Embodiment

Figure 9A:
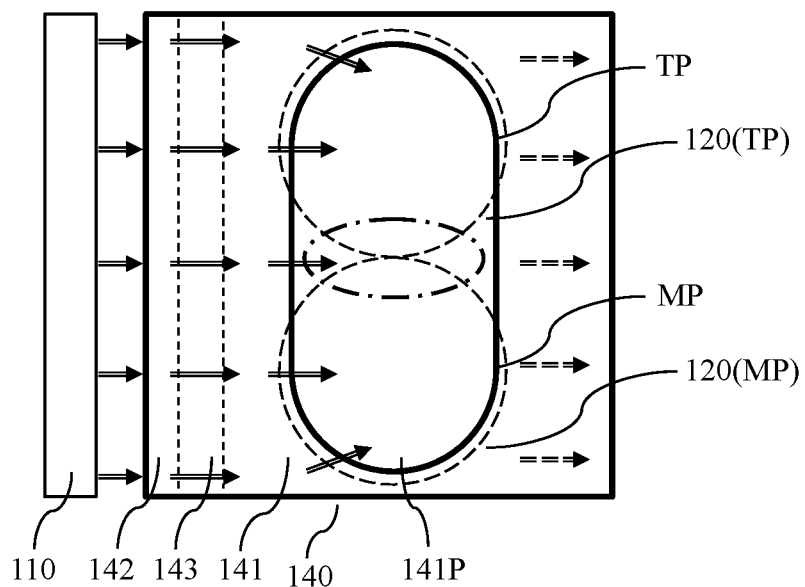
FIG. 9A illustrates an example in a case where the rectifying plate 140 has an oval opening as a configuration in a fifth embodiment.
Figure 9B:
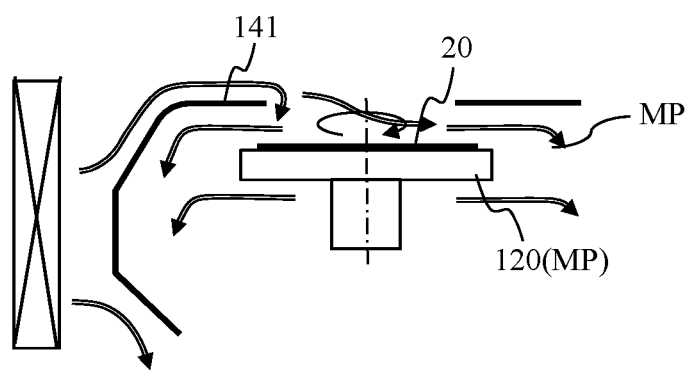
FIG. 9B illustrates an example in a case where the rectifying plate 140 has an oval opening as a configuration in the fifth embodiment.
Figure 9C:
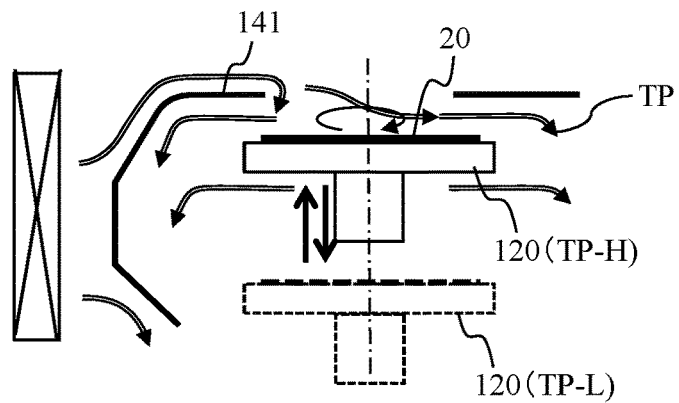
FIG. 9C illustrates an example in a case where the rectifying plate 140 has an oval opening as a configuration in the fifth embodiment.

FIGS. 9A to 9E illustrate the configuration of the fifth embodiment of the present invention. As in FIG. 8, FIG. 9A illustrates a top view of the rectifying plate, FIG. 9B illustrates a side view when the stage 120 is at the measurement position MP, and, furthermore, FIG. 9C illustrates a side view when the stage 120 is at the transfer position TP. Further, in the top view of the rectifying plate in FIG. 9A, the positions 120 (MP) and 120 (TP) of the stage 120 at the measurement position MP and the transfer position TP are shown by a broken line. Furthermore, the airflow on the upper surface of the rectifying plate 140 is shown by a solid line, and the airflow on the lower surface is shown by a broken line.

In FIGS. 9A to 9E, the opening 141P of the rectifying plate 140 is formed in an oval shape extending from the measurement position MP to the transfer position TP. The size of the opening 141P is formed smaller than the stage 120 (broken line at the measurement position MP and the transfer position TP in the diagram) at both end positions of the measurement position MP and the transfer position TP. The opening 141P further has a semicircular shape at both end portions, and the semicircular portion is configured to overlap with the outer peripheral portion of the stage 120. The opening 141P is formed so as to overlap in a semicircular region on the outer peripheral portion of the stage 120.

With this configuration, at the measurement position MP in FIG. 9B, as in FIG. 8B, a negative pressure is generated in the region overlapping in a semicircular shape with the rectifying plate 140 on the front side of the stage 120, and the airflow is drawn in in the outer peripheral portion of the stage 120 by the rotation of the stage 120 and discharged downward. On the TP side when the stage 120 is viewed from the side (indicated by an ellipse of an alternate long and short dash line in FIG. 9A), the negative pressure region described in FIG. 4 is not generated because the rectifying plate 140 is not disposed above the stage 120. However, a downward force is applied to the airflow due to the flow from the rectifying plate 140 to below the stage 120 through the opening 141P. Due to these actions, the airflow is discharged downward in the outer peripheral portion of the stage 120, so that the semiconductor wafer 20 placed on the stage 120 can be kept clean.

Further, in this configuration, as shown in FIG. 9C, an opening is provided above the stage 120 in the rectifying plate even at the transfer position TP. For this reason, in a case where the stage 120 starts rotating at the TP position before the inspection starts, or until the stage 120 returns to the TP position and stops rotation after the inspection ends, the effect of drawing in the airflow by rotation can be obtained by drawing in in the outer peripheral portion of the stage 120 and the flow moving downward of the stage 120 like at the measurement position MP in FIG. 9B, and the airflow is discharged downward in the outer peripheral portion of the stage 120.

Furthermore, in this configuration, even when the stage 120 moves while rotating between the measurement position MP and the transfer position TP, there is a region where the outer peripheral portion of the stage 120 and the rectifying plate 140 overlap, and the effect of drawing in the airflow due to rotation is obtained in this portion.

Figure 9D:
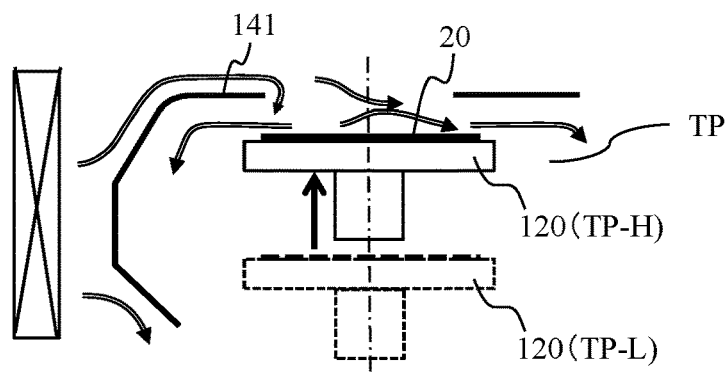
FIG. 9D illustrates an example in a case where the rectifying plate 140 has an oval opening as a configuration in the fifth embodiment.
Figure 9E:
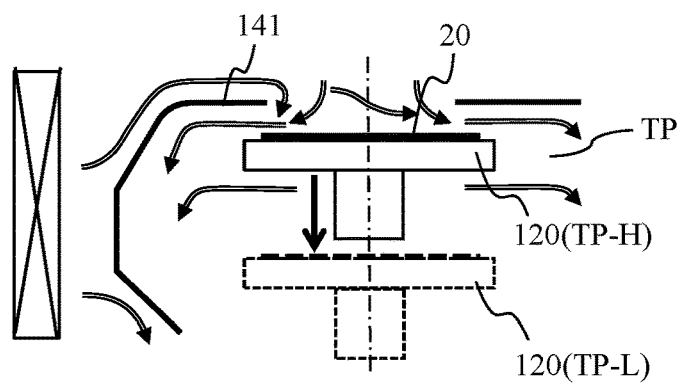
FIG. 9E illustrates an example in a case where the rectifying plate 140 has an oval opening as a configuration in the fifth embodiment.

Further, as an advantage of this configuration, since the opening 141P is provided in the rectifying plate 140, the influence of the ascending and descending operation of the stage 120 at the transfer position TP on the airflow around the semiconductor wafer 20 is reduced. As shown in FIG. 9D, around the stage 120, a clean airflow supplied from the gas supply device 110 flows from the opening 141P at the transfer position TP toward below the stage 120. For this reason, in a case where the stage 120 rises, the air on the upper surface of the semiconductor wafer 20 is discharged to below the stage 120 from the outer peripheral portion of the stage 120 and the semiconductor wafer 20. Even in a case where a part of the airflow is directed upward from the opening 141P, this part is guided by the airflow flowing from the gas supply device 110 and discharged to the downstream side through the lower surface of the rectifying plate 140. Further, as shown in FIG. 9E, even in a case where the stage 120 descends, a clean airflow is supplied to the upper surface of the semiconductor wafer 20 from the opening 141P, so that the airflow is discharged downward from the outer peripheral portion of the stage 120. For this reason, unlike FIGS. 8D and 8E, pushing out and sucking of the airflow by the vertical operation of the stage 120 hardly occur, and the possibility of a foreign matter adhering to the semiconductor wafer 20 is significantly reduced.

Note that, previously in FIG. 3, for the case where the opening of the rectifying plate 140 is circular, the numerical ranges of the size of the opening and the overlap with the stage 120 are examined. Also in FIG. 9, the effect of the present invention preferably appears when the size of the opening of the oval portion and the overlap with the stage 120 at both end positions of the transfer position TP and the measurement position MP are within the above ranges.

Figure 10:
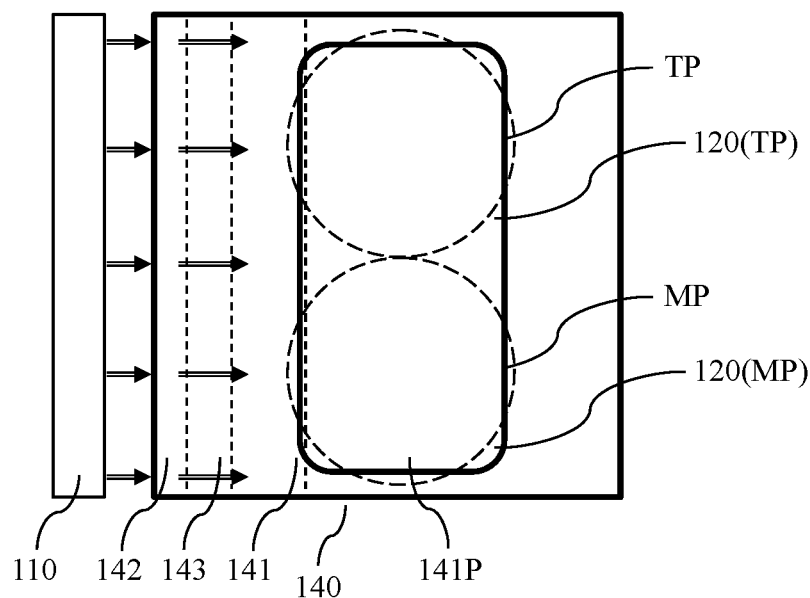
FIG. 10 illustrates a configuration example in which the upper opening shape of the rectifying plate 140 is rectangular as a comparative example.

FIG. 10 illustrates a configuration example in which the upper opening shape of the rectifying plate 140 is rectangular as a comparative example. In the example shown in FIG. 9, the upper portion of the rectifying plate 140 has an oval-shaped opening, has no corners, and is circular. In contrast, the opening in FIG. 9 is rectangular, and the corners are right angles (or a shape close to a right angle). When the corners are at right angles as described above, there is no region overlapping with the semiconductor wafer 20 at the corners. Accordingly, there is a possibility that the action of guiding the airflow to move downward of the stage 120 is weakened. In contrast, if the rectangular opening is made small so that the opening overlaps with the entire circumference of the wafer, the overlapping region with the semiconductor wafer 20 does not become uniform in the circumferential direction. In this shape, the action of guiding the airflow to move downward of the stage 120 varies in such a manner that, for example, the action same as that in FIG. 5D is obtained in a location where the overlapping region is large and the action same as that of the first embodiment is obtained in other locations, resulting in an unstable airflow state. Therefore, it is desirable that the upper opening of the rectifying plate 140 have a circular or oval shape as shown in FIGS. 8 and 9. However, even if the opening shape is rectangular as shown in FIG. 10, it can be said that the effect of the present invention can be obtained although the effect is limited.

Figure 11:
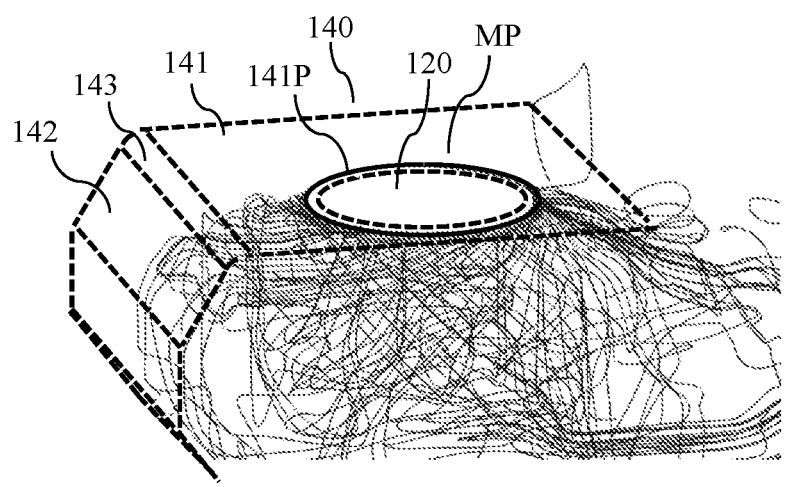
FIG. 11 illustrates the state of an airflow at a measurement position MP in a case where the upper part of the rectifying plate 140 has the circular opening of FIG. 8A.

To show the effect of the present configuration, FIG. 11 illustrates the state of an airflow at the measurement position MP in a case where the upper part of the rectifying plate 140 has the circular opening of FIG. 8A. Here, the schematic structure of the rectifying plate of FIG. 8A is shown by a perspective view together with the streamline of the airflow. As described in the description of FIG. 4, in the stage 120, there is a possibility that dust from the mechanical portion or the like is discharged by the airflow emitted from the outer periphery. In view of the above, FIG. 11 shows a streamline starting from the outer periphery, assuming that dust is emitted from the outer peripheral portion of the stage 120.

The streamline from the outer periphery of the stage 120 is emitted in the outer periphery direction by the swirling flow due to the rotation, and then moves downward of the stage 120 by the action of drawing in the airflow from above the stage 120 due to the negative pressure generated by the rotation of the stage 120. Further, the flow toward the rectifying plate 140 is also guided to move downward of the stage 120 by the first part 141, the third part 143, and the second part 142 of the rectifying plate 140 and discharged. By these, even if dust is released from the mechanism and the like of the stage 120 toward the outer peripheral portion, the airflow from the outer periphery of the stage 120 can be reliably guided to move downward of the stage 120. That is, it is possible to suppress the possibility that the semiconductor wafer 20 is contaminated by the adhesion of a foreign matter due to the hoisting of the airflow.

FIG. 11 shows a result at the measurement position MP in a case where the opening of the rectifying plate 140 is circular as in FIG. 8. However, the same result can be obtained at the transfer position TP. Further, even in a case where the opening is oval as in FIG. 9, the same airflow behavior can be obtained at both the measurement position MP and the transfer position TP.

The effect of reducing foreign matter adhesion by applying the configuration of the present invention was quantitatively verified. The number of foreign matters attached was evaluated by the foreign matter increase rate or the foreign matter increase number when the semiconductor wafer 20 was transported to the examination device 10 1000 times. Generally, a surface examination device for a semiconductor wafer is required to minimize the adhesion of a foreign matter in the inspection process, and the specifications show that the foreign matter increase rate is about 0.01 to 0.02 piece/time. This corresponds to the foreign matter increase number of 10 to 20 when the semiconductor wafer 20 is transported 1000 times.

Even before the configuration of the present invention was applied, the foreign matter increase rate was about 0.01 to 0.02 piece/time, which satisfied the specifications. In contrast, by applying the fifth embodiment of the present invention, that is, the rectifying plate having the oval-shaped opening shown in FIG. 9, the foreign matter increase rate became about 0.001 to 0.002 piece/time. This is about 1/10 of that before the application, and corresponds to the fact that only one or two foreign matters adhere even in a case where the semiconductor wafer is transported 1000 times. The present invention has the effect of reducing the adhesion of a foreign matter in the inspection process to about 1/10, and can contribute to the improvement in the quality of the inspection process.

<Variation of present invention>

The present invention is not limited to the above embodiments and includes a variety of variations. For example, the above embodiments are described in detail for easy understanding of the present invention, and the present invention is not necessarily limited to embodiments that include all the described configurations. Part of a configuration of a certain embodiment can be replaced with a configuration of another embodiment, and a configuration of a certain embodiment can be added to a configuration of another embodiment. Further, for part of a configuration of each embodiment, other configurations may be added, removed, or replaced.

For example, the configuration of FIG. 7A described in the second embodiment can be employed to the upstream side (the gas supply device 110 side) of the rectifying plate 140, and the configuration of FIG. 7B described in the third embodiment can be employed to the downstream side (the opposite side to the gas supply device 110 side).

In the above embodiments, examples are described in which the rectifying plate 140 is disposed on both the upstream side (the gas supply device 110 side) and the downstream side (the opposite side to the gas supply device 110 side). However, the effect of the present invention can be appropriately exhibited at least by arranging the rectifying plate 140 on the upstream side.

In the above embodiments, the semiconductor wafer 20 is exemplified as the test object to be inspected by the examination device 10. However, the test object is not limited to this, and the present invention can also be applied to the examination device 10 that inspects a test object other than the semiconductor wafer 20.

REFERENCE SIGNS LIST

10 Examination device
20 Semiconductor wafer
100 Inspection chamber
110 Gas supply device
120 Stage
130 Optical inspection unit
140 Rectifying plate
150 Exhaust port
200 Cartridge
300 Handling mechanism
310 Prealigner

The invention claimed is:

1. An examination device that inspects a substrate placed on a stage, the examination device comprising:
a gas supply unit, which includes a fan, that supplies a flow of gas from a side of the stage to inside of an inspection chamber where the stage is disposed;
an exhaust port that discharges the gas from the inspection chamber; and
a rectifying plate that rectifies flow of the gas,
wherein the rectifying plate has a first part disposed over a portion of an upper surface of the stage,
wherein the rectifying plate has a second part that is disposed between a supply port by which the gas supply unit injects the gas and the stage so as to prevent flow of the gas supplied by the gas supply unit from directly hitting the substrate,
wherein the first part and the second part are formed as continuous parts of the rectifying plate,
wherein the rectifying plate is disposed such that a first gap exists between the first part and the portion of the upper surface of the stage, and
wherein the rectifying plate is disposed such that a second gap is between the second part and the stage.

2. The examination device according to claim 1,
wherein the first part and the second part are oblique with respect to one another and formed with a bent or curved shape between the first part and the second part.

3. The examination device according to claim 2,
wherein the rectifying plate has a shape in which the first part and the second part are formed with an intervening flat plate bent at an obtuse angle.

4. The examination device according to claim 3,
wherein the rectifying plate is disposed so that the first part has an inclination angle that is not parallel to an upper surface of the stage.

5. The examination device according to claim 3,
wherein the rectifying plate is disposed so that the second part has an inclination angle that is not parallel to a normal direction of the stage.

6. The examination device according to claim 2,
wherein the rectifying plate has a shape in which the first part and the second part are formed by being curved in an arch shape.

7. The examination device according to claim 6,
wherein the rectifying plate is formed into a shape in which a distance between the first part and an upper surface of the stage gradually decreases from center of an upper surface of the stage toward outer periphery.

8. The examination device according to claim 6,
wherein the rectifying plate is formed into a shape in which a distance between the second part and the stage gradually increases toward below the stage.

9. The examination device according to claim 1,
wherein the stage is configured so that the substrate can be moved between a transfer position for receiving the substrate from outside the inspection chamber and a measurement position for inspecting the substrate, and
wherein the rectifying plate extends from the transfer position to the measurement position.

10. The examination device according to claim 1,
wherein the rectifying plate has an opening through which the gas passes from the supply port toward an upper surface of the stage, and
wherein the opening has a circular shape so as to have a region overlapping with the stage at a measurement position for inspecting the substrate when projected onto an upper surface of the stage.

11. The examination device according to claim 1, wherein the rectifying plate has an opening through which the gas passes from the supply port toward an upper surface of the stage, and wherein the opening has an oval shape so as to have a region that extends from a transfer position for receiving the substrate from outside the inspection chamber to a measurement position for inspecting the substrate and overlaps with the stage at each of the positions when projected onto an upper surface of the stage.

12. The examination device according to claim 11, wherein the stage is configured to be able to move from a first position to a second position above the first position along a vertical direction at the transfer position, and wherein the stage moves to the second position after receiving the substrate from outside the inspection chamber at the first position, and further moves to the measurement position along a horizontal direction.

13. The examination device according to claim 1, wherein the rectifying plate is configured to guide flow of the gas supplied by the gas supply unit in order of above the first part, an upper surface of the stage, the first space, and the second space.

14. The examination device according to claim 1, wherein the rectifying plate is disposed at a side of the gas supply unit and at an opposite side from the gas supply unit, and wherein the rectifying plate has a same shape as the first part at the opposite side.

15. The examination device according to claim 1, wherein the gas supply unit supplies the gas laterally.

16. The examination device according to claim 15, wherein the gas supply unit provides the flow of gas below the rectifying plate, thereby supplying the gas to a space inner from the rectifying plate.

17. The examination device according to claim 16, wherein the rectifying plate forms a gap that provides negative pressure due to Venturi effect at a space inner from the rectifying plate.

* * * * *